Figure 1:
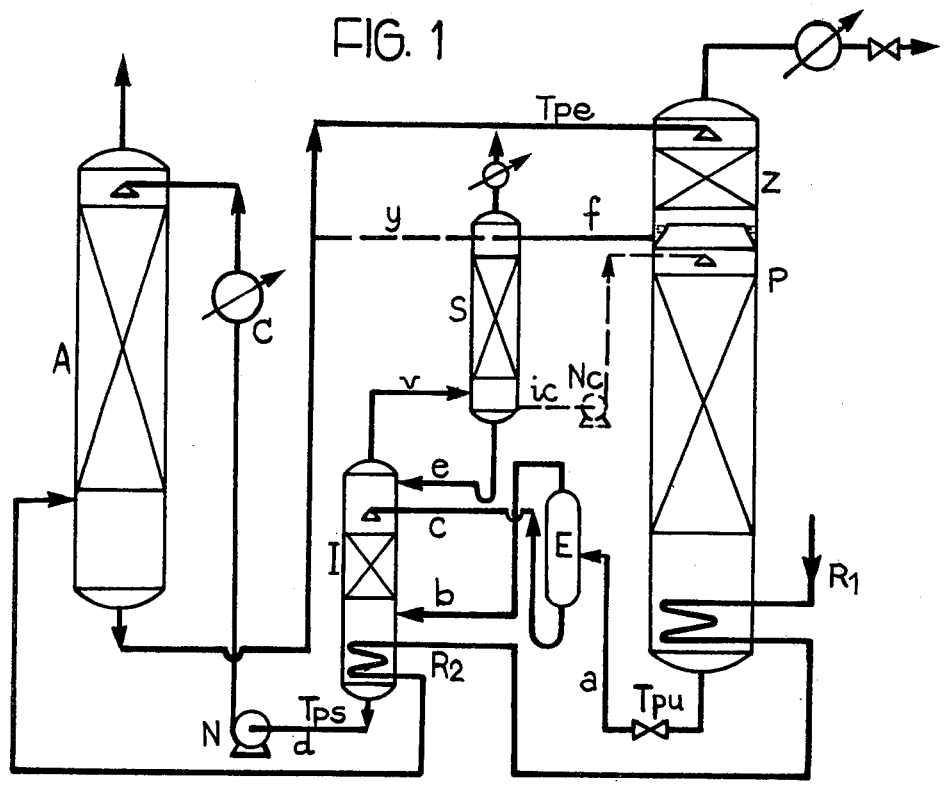

United States Patent [19]

Giammarco et al.

[11] 4,073,863
[45] * Feb. 14, 1978

[54] REGENERATION OF ABSORBENT SOLUTIONS USED FOR REMOVING GASEOUS ACID IMPURITIES FROM GASEOUS MIXTURES

[76] Inventors: Giuseppe Giammarco; Paolo Giammarco, both of San Marco 3242, Piazzale Morolin, Venice, Italy

[*] Notice: The portion of the term of this patent subsequent to June 8, 1993, has been disclaimed.

[21] Appl. No.: 635,823

[22] Filed: Nov. 28, 1975

[30] Foreign Application Priority Data

Nov. 28, 1974 Italy .................................. 70464/74

[51] Int. Cl.$^2$ ............................................ B01D 53/34
[52] U.S. Cl. .................................... 423/222; 423/223; 423/228; 423/232; 423/236; 423/242; 423/243
[58] Field of Search ............... 423/210, 220, 222, 223, 423/232, 229, 236, 242, 243

[56] References Cited

U.S. PATENT DOCUMENTS

| | | | |
|---|---|---|---|
| 3,563,695 | 2/1971 | Benson | 423/223 |
| 3,563,696 | 2/1971 | Benson | 423/223 |
| 3,714,327 | 1/1973 | Giammarco | 423/220 |
| 3,725,529 | 3/1973 | Giammarco et al. | 423/223 |
| 3,823,222 | 7/1974 | Benson | 423/232 |
| 3,962,404 | 6/1976 | Giammarco | 423/222 |

Primary Examiner—Earl C. Thomas
Attorney, Agent, or Firm—Sughrue, Rothwell, Mion, Zinn and Macpeak

[57] ABSTRACT

Improvements in the elimination and recovery of gaseous acid impurities from a gaseous mixture containing them, by an absorbing step, wherein said gaseous mixture is brought into contact with an alkaline absorbing solution and a regeneration step wherein the exhausted absorbing solution is regenerated by steam stripping, said absorption step comprising a main column and a secondary column, the main column operating at a higher pressure and by means of a supply of outside heat, the secondary column operating at a lower pressure and substantially by means of the steam obtained by expansion of the solution regenerated in the main column. The exhausted solution to be regenerated is conveyed firstly in one of the two regeneration columns wherein it is regenerated in an incomplete way, and subsequently into the other column where its regeneration is completed.

43 Claims, 8 Drawing Figures

REGENERATION OF ABSORBENT SOLUTIONS USED FOR REMOVING GASEOUS ACID IMPURITIES FROM GASEOUS MIXTURES

The present invention relates to improvements in the regeneration of absorbing solutions used for removing gaseous impurities from a gaseous mixture containing the same.

More particularly, the present invention considers the purification cycles wherein a gaseous mixture containing various acid impurities of the type $CO_2$, $H_2S$, HCN, $SO_2$, either alone or jointly, is washed, in an absorption step, by an absorbing solution having the appropriate chemical composition, such as an aqueous solution of alkali metal carbonates, simple or activated by addition of $As_2O_3$, of glycine and other amino acids, or by the addition of ethanolamines such as MEA, DEA and similar; aminoacid solutions; solutions of ethanolamines, such as MEA, DEA, TEA and similar; solutions of alkali metal phosphates, sulfites and bisulfites, borates and similar, in such a way as to absorb and to remove the above said impurities. This absorption step is carried out at 40° to 135° C. The solution is then conveyed to the regeneration step where it is regenerated by steam stripping, thus removing the previously absorbed impurities, which are discharged on the outside. The solution thus regenerated is brought back to the absorption stop, and the cycle is thus closed.

As is known, it is necessary to supply a considerable amount of heat from the outside, generally by means of a reboiler, for producing the stripping steam of the regeneration stage which is needed for the functioning of the purification cycles of the above-mentioned type.

It is also known that a number of studies and experiments have been carried out and that a great number of novel methods and devices have been proposed for the purpose of reducing said amount of heat, which constitutes the more important expense for the functioning of the purification cycle.

Reference is made in this connection to the co-pending U.S. patent application Ser. No. 443,573 of Feb. 19, 1974 now U.S. Pat. No. 3,962,404 by Applicants whose disclosure is incorporated herein by reference, since the present application, as will be clear from the following, can be considered as an improvement and an extension of said co-pending application insofar as it is also an object of the present application to propose a new method and new embodiments for reducing said amount of heat necessary for the functioning of the cycle.

In U.S. Pat. No. 3,962,404 it was first noted that the heat consumption of the purification cycle is remarkably higher (almost twice as much), in the known art, than in the purification cycles wherein the regeneration of the solution is achieved by stripping with air or other inert gases. After analyzing the reasons for such a consumption, there was suggested a new regeneration method whose thermal efficiency is remarkably improved by the fact that the heat supplied from the outside in the regeneration stage is used at two consecutive levels of pressure, so that the heat which is not utilized at the first level, is used at the second level.

Said method consists in subdividing the exhausted solution to the regenerated in two fractions, respectively a principal and a secondary fraction, and in regenerating said fractions in parallel in two columns, respectively a principal and a secondary column, the principal column functioning at a pressure of at least 0.2-0.5 atmospheres above that of the secondary column and anyway sufficient for releasing to the latter for regenerative purposes, the heat stored in the former.

The pressure of the principal column is moreover regulated so that the heat which, in the hitherto known art, was discharged on the outside at the outlet of the said column (generally through a cooler), is on the contrary recovered and stored in the solution, thereby to recover a large amount of the heat supplied by the reboiler, in a form still available, as an increase in temperature of said solution at the bottom of the column. The best thermal efficiency is obtained by establishing a temperature difference of the solution of 10°–35° C between the top and the bottom, depending on the unitary amount of heat supplied to the solution and depending on the impurities content of the exhausted and regenerated solution, this leading to an abandonment of the isothermal cycle.

The heat thus saved and stored in the regenerated principal fraction is then released to the secondary fraction, preferably by expansion and release of steam, the latter being used for regenerating at lower pressure the secondary fraction in the secondary column.

Summarizing, the heat which was lost in the known art at the top of the regeneration column is on the contrary recovered and used in a lateral column at lower pressure, for regenerative purposes.

The present invention, as already stated, completes and improves the method of U.S. Pat. No. 3,962,404.

A — By means of a new method and new embodiments which allow the heat stored in the solution to be utilized in an improved and more complete manner for producing steam (by expansion) and for using said steam for regenerative purposes in said depurative cycle, thereby to decrease the consumption of heat supplied from the outside;

B — By means of new indications, teachings and dispositions aiming at recovering in a more complete manner the heat which was not utilized and last at the top of the regeneration column in the prior art, delivering said heat to the regenerated solution and using it finally for regenerative purposes as above-indicated in A.

It should now be noted that the aforesaid co-pending Application discloses fundamentally a single method only for the utilization of the said heat contained in the regenerated solution for a regenerative purpose.

Said method consists essentially in subdividing the exhausted solution coming from the absorber into two fractions, respectively, the main- and the secondary one. The main fraction is delivered to the main column operating at a higher pressure and with an outside supply of heat; the secondary fraction is delivered to the secondary column operating at a lower pressure and is regenerated therein, prevalently by supplying heat produced in the expansion of the main regenerated solution, that is by the heat stored in said solution.

The above mentioned method has shown two drawbacks; the first one derives from the fact that, due to the subdivision of the solution, only the heat of a part of said solution is utilized, which limits the thermal efficiency of the method; the second drawback comes from the fact that the amount of $CO_2$ and/or $H_2S$ desorbed under pressure is not sufficient, in most cases, for the requirements of the industrial practice.

The present invention, besides eliminating the two aforesaid drawbacks, has the advantage of expanding the inventive idea to other embodiments having a greater extension and convenience. Said embodiments present the common characteristic that the exhausted solution, instead of being subdivided into two fractions at the outlet of the absorber, is substantially conveyed in its totality to one of the two hereinbefore indicated regeneration columns where it is regenerated in an incomplete manner and with a lesser heat supply; subsequently it is conveyed to the other regeneration column wherein the regeneration of said solution is brought to completion and improved up to the required value.

Figure 2:
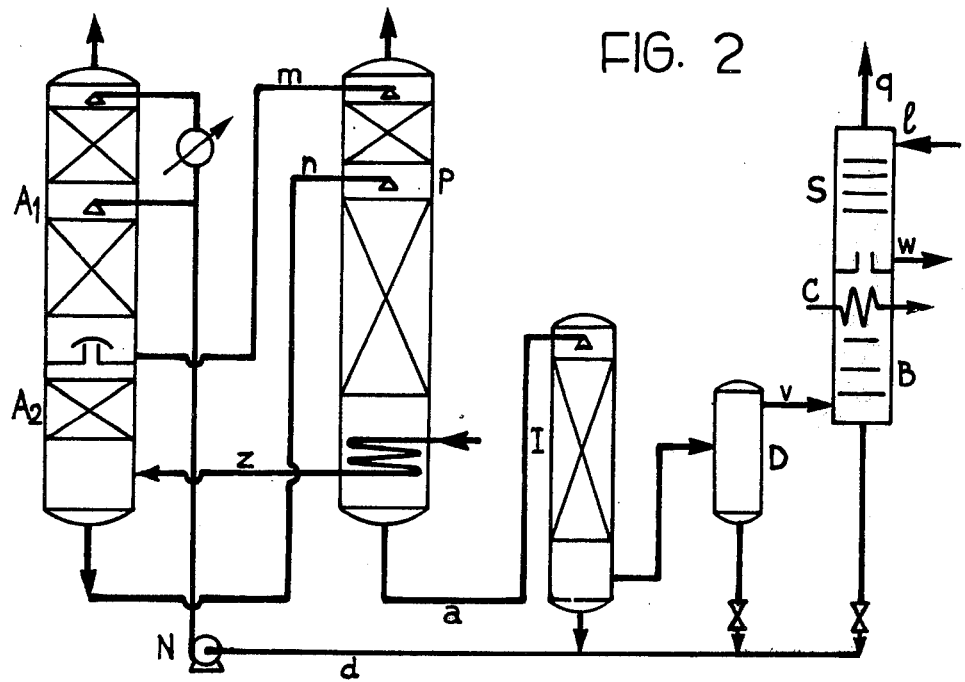
Figure 3:
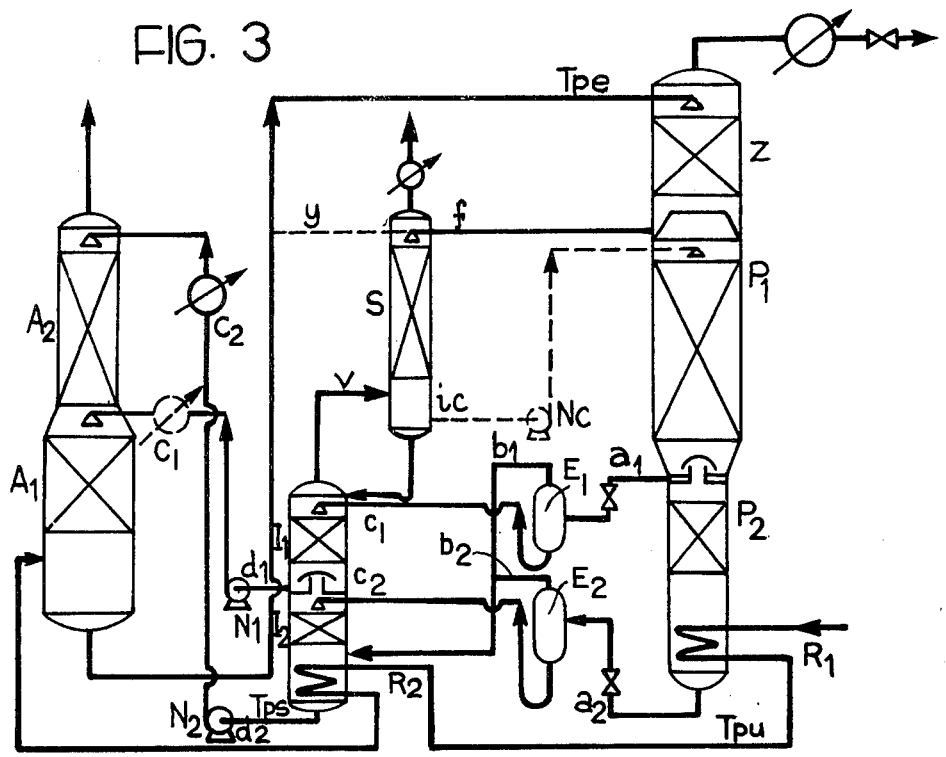
Figure 4:
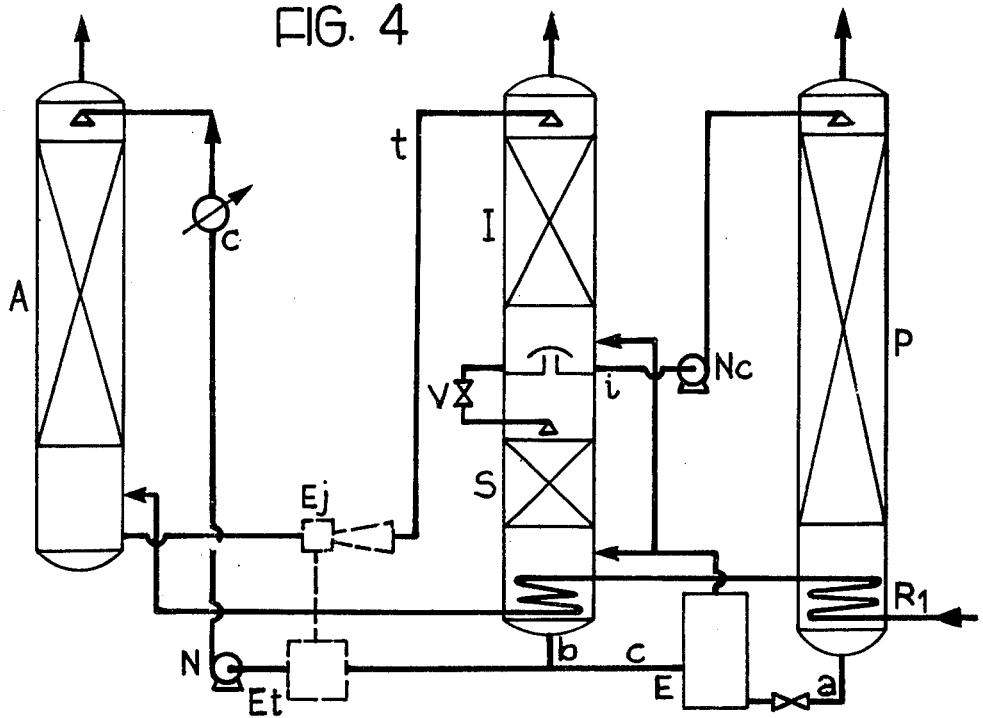
Figure 5:
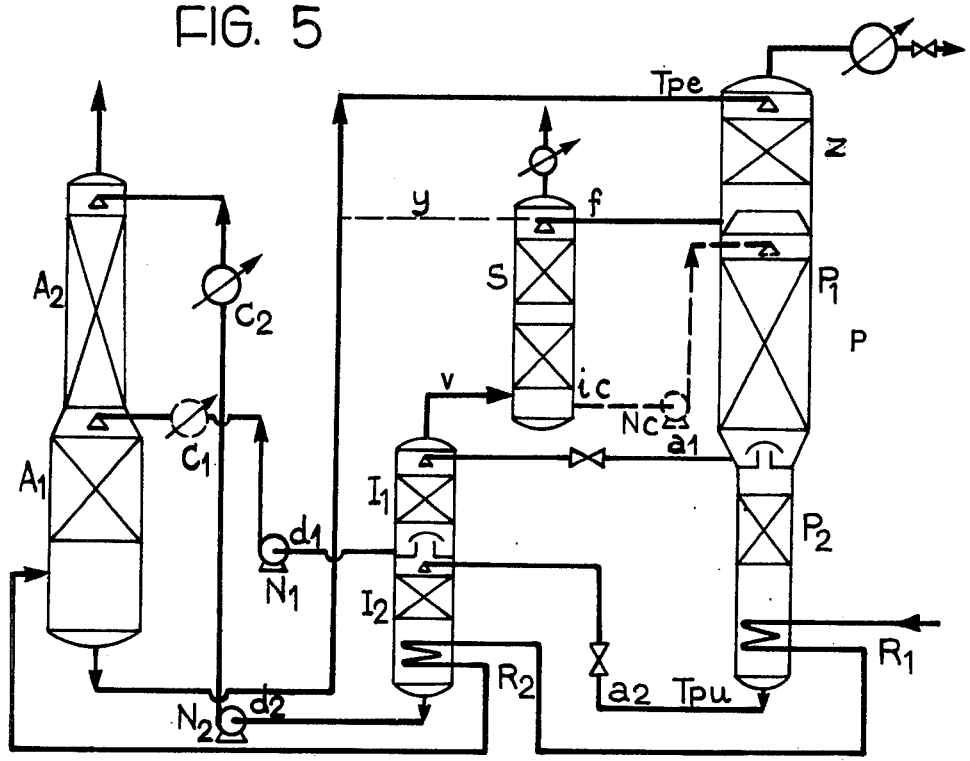
Figure 6:
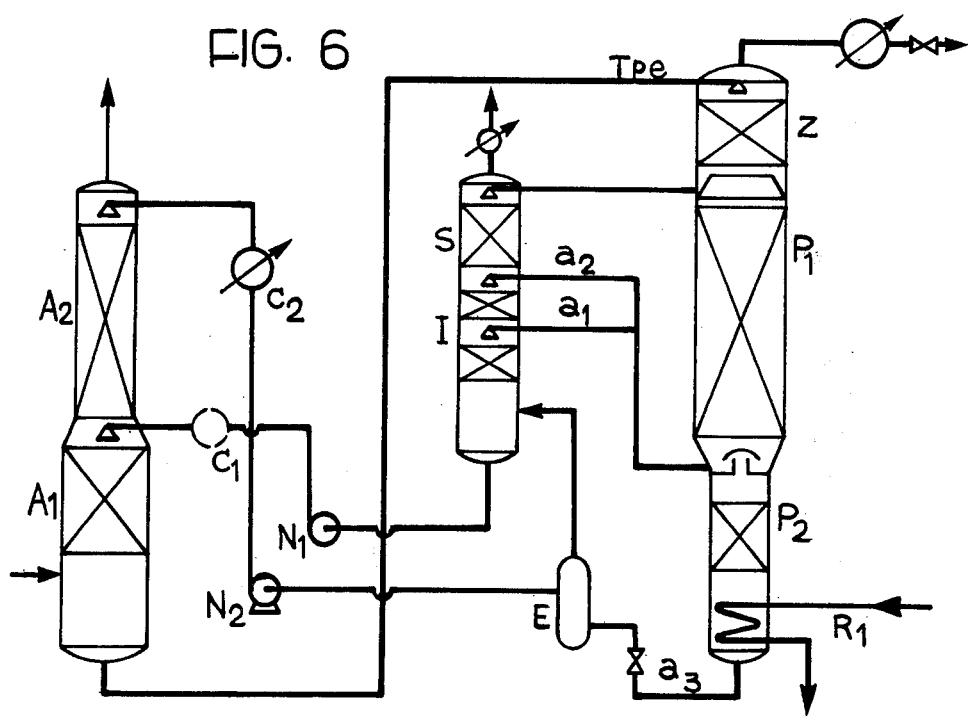

The above mentioned embodiments will be represented, in a general way, with reference to FIG. 1 to 7 of the accompanying drawings, wherein FIGS. 1, 4, 5 and 7 illustrate substantially the said embodiments and FIGS. 2, 3 and 6 illustrate additional or complementary embodiments.

FIG. 1 — The exhausted solution is delivered in its totality to the main regeneration column at a higher pressure, wherein it is regenerated in an incomplete manner through a supply of outside heat, and then is expanded with production of steam; subsequently it is conveyed to the secondary regeneration column at a lower pressure, wherein its regeneration is completed by means of the said steam previously produced in the expansion. This embodiment is particularly apt for producing about 90% of the $CO_2$ under pressure.

FIG. 2 — The embodiment of FIG. 1 is presented in a simplified version requiring a lesser expensive plant. The heating of the water feeding the boiler by direct contact with the steam produced in the expansion, after its utilization in the secondary column, is envisaged as a possible alternative.

FIG. 3 — The embodiment of FIG. 1 is applied to a two stage cycle.

FIG. 4 — The exhausted solution is conveyed in its totality to the secondary regeneration column at a lower pressure and then conveyed, by pumping, to the main regeneration column at a higher pressure. In the secondary column the solution is heated and pre-regenerated by the steam produced by the expansion of the regenerated solution extracted from the main column. The regeneration of the solution is completed in the main column through supply of heat from the outside. This embodiment is suitable for an absorption at low temperature, with the advantage of desorbing $H_2S$ substantially in the secondary column.

FIG. 5 — The exhausted solution is conveyed, substantially in its totality, to the main column at a higher pressure. From this column, two or more fractions of solution with a different degree of carbonation, are extracted at different heights and are directly conveyed at different heights of the secondary column at lower pressure. The steam that each fraction of solution develops in expanding in the secondary column is utilized to regenerate the overlying fractions at a greater degree of regeneration. This embodiment is particularly suitable for the two stage cycles.

FIG. 6 — The embodiment of FIG. 5 is applied in a simplified manner.

Figure 7:
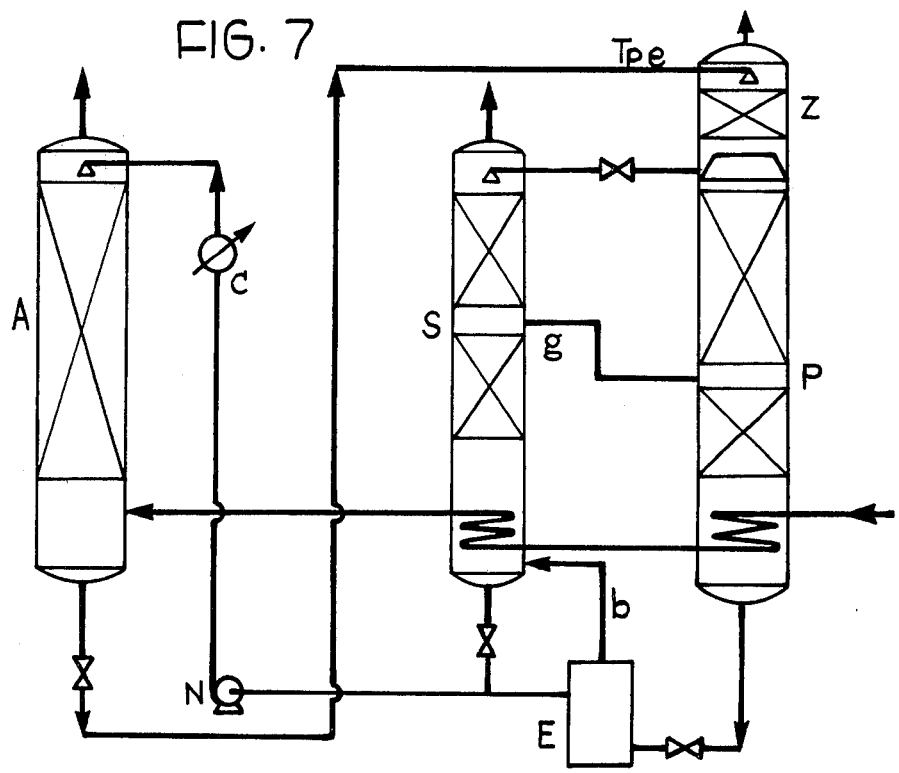

FIG. 7 — In this Figure is shown a modification wherein the heat of the main regeneration column is delivered to the secondary column in the form of a flow of steam extracted from the main column and conveyed to the secondary column.

Figure 8:
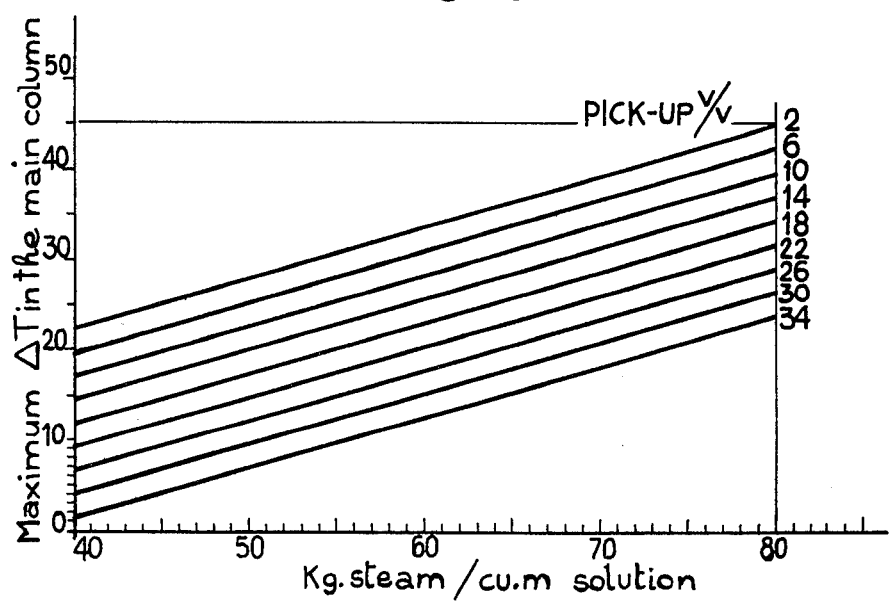

FIG. 8 — FIG. 8 is a diagram showing the maximum increase and temperature obtainable in the main stripping column as a function of the supplied external heat at different loadings or "pick-up values" (volume $CO_2$ per volume of the solution).

It should be noted that, in the U.S. Pat. No. 3,962,404, the pressure in the main column is controlled in such a way that the heat, which in the technique known so far, is discharged at the top of the column in the form of steam in unjustifiable excess with respect to the equilibrium conditions prevailing at the top of the said column, is instead recovered and is found again as a temperature increase of the regenerated solution at the bottom of the column. In said co-pending Application, it is considered, in a first approach, that the above mentioned steam excess is essentially constituted by stripping steam obtained by a supply of heat from the outside by means of the reboiler. In order to avoid its loss and to recover it, the main column pressure is controlled in such a way as to increase the boiling temperature of the solution at the bottom and to set a temperature difference with that of the solution at the top, so that the solution absorbs for its heating the above said excess of stripping steam.

In the present invention, the above teachings are expanded and improved.

It is first to be noted that the pressure intervention in the principal column, as it has now been ascertained, facilitates, in comparison to that which occurs at atmospheric pressure, the steam absorption, wherefore it is possible to reduce the excess of steam issuing at the top of the column to 1.5–3 times the amount corresponding to the equilibrium conditions prevailing at the top of said column.

It has now been found that the temperature difference between the top and the bottom, instead of the above-indicated range of from 10° to 35° C, depending on the regeneration degree to be reached and therefore, on the unitary amount (Cal/cu.m of solution) of heat supplied from the outside, has to be conveniently modified and increased up to 45° C, as is the case when the solution to be regenerated contains relatively small amounts of impurities, or is treated with high unitary amounts of steam. This fact results from the diagram of FIG. 8 of the accompanying drawings, wherein it has been deemed appropriate to better define the question. In the diagram the abscissas represent the unitary amount of heat, expressed as kg of steam / cu.m of solution, supplied from the outside by means of the reboiler (1 kg steam = 540 Cal); the ordinates represent the temperature difference between the top and the bottom of the column; the oblique curves refer to the $CO_2$ and $H_2S$ volumes absorbed per cu.m of solution (pick-up). The diagram is relative to the utilisation of a potassium carbonate absorbing solution activated by addition of glycine, having a concentration of 250 g/l of $K_2O$ and 50 g/l of glycine. It should be noted that said bottom temperature of the column is reckoned, in the cases wherein several fractions of solution are extracted from the column, by calculating the average ponderable temperature of said extracted fractions.

In the other cases of application of the present invention, that is with solutions of another nature and composition, the general direction, including any other direction already given in the aforesaid co-pending Application, consists in increasing the pressure in the main column as much as possible, that is until the heat of the steam recovered at the top of the column is equal to the heat required for the temperature increase that the pressure increase produces at the bottom, that is in such a way that the supply of outside heat through the reboiler should not vary during the increase in pressure. This corresponds approximately to control the pressure until the excess of stripping steam at the top of the column is not greater than 1.5–3 times that corresponding to the equilibrium condition as hereinbefore mentioned.

Besides, the said co-pending Application considered also that the increase in pressure applied to the main column allowed for the recovery not only of the stripping steam in unjustifiable excess with respect to the equilibrium conditions at the top of the column, but also of the steam that the exhausted solution coming from the absorption step at high temperature produces when it expands (flashes), at the regeneration column pressure. In order to clarify the question, it is appropriate to remember that the increase in pressure required for the stripping steam recovery, allows also the recovery of the steam produced in the flashing of the exhausted solution, while, on the contrary, it is possible to recover at least a great part of the steam of the said flashing without recovering the stripping steam. It should be remembered, finally, the statement of paragraphs 2a and 2b of the said co-pending Application, according to which the recovery of the stripping steam and of the flashing steam corresponds to the maximum thermal efficiency, while, in practice, the present invention can be used also under conditions of lesser efficiency.

C — It results from that which has been specified in the preceding paragraphs that one of the features of the present invention consists in the great case of application in various application fields.

The embodiments described in the present application (having for object the utilization of the heat contained in the solutions regenerated in the principal column, for producing steam by expansion and using said steam in the secondary column for regenerative purposes) are self-reliant and can be used also without increasing the pressure in the principal column for achieving a temperature difference of 10°–45° C, as previously suggested, for obtaining a better recovery of the steam issuing in unjustifiable excess at the top of the column.

A temperature difference lower than 10°–45° C can obviously be utilized, though it is less advantageous. Moreover, depending on the application case, the operator may at will effect a recovery of the steam issuing in excess at the top of the column, either in the form of stripping steam or in the form of steam produced by flashing of the solution coming at high temperature from the absorption stage, without affecting the validity of the method of the present invention.

The various embodiments of the method of the invention will now be described in detail. In FIGS. 1–7 like elements are designated alphabetically by like reference letters.

1. In the embodiment of FIG. 1, the exhausted solution to be regenerated is conveyed to the top of the main column P, whose operating pressure is controlled according to the conditions previously specified.

It should be remembered that in the present embodiment as well as in those subsequently described, the temperature difference $T_{pu} - T_{ps}$ represents the amount of steam developed by the expansion of the regenerated solution extracted from the main column P and which is used in the secondary column S. Said difference $T_{pu} - T_{ps}$ consists of two parts, that is the difference $T_{pe} - T_{pu}$ which represents the amount of heat, coming from the reboiler, which is recovered according to the method of the present invention; and the difference $T_{pe} - T_{ps}$ which represents the amount of heat that the absorption stop supplies to the regeneration step, consisting, as known, of the heat of reaction and of the heat contained in the gaseous mixture to be purified, which is fed to the absorber.

Therefore the operator has a large possibility of choice and, by conveniently increasing the pressure in the main column, he can avail himself of an increasing amount of steam to be utilized in the secondary column up to the maximum previously specified.

The solution is regenerated in said main column P in an incomplete manner, that is with a lesser amount of heat supplied from outside by means of the reboiler $R_1$. Subsequently the solution is extracted by means of pipe "a" and conveyed to expansion chamber E. The steam produced in said expansion is conveyed to the bottom of the secondary column I by means of pipe "b"; the solution, after expansion, is conveyed, by means of pipe "c," to the top of column I, where it flows down in countercurrent with the above said steam, thus improving and completing its regeneration up to the point pre-established in the plan. The solution is regenerated also by the steam produced in the reboiler R2. Finally the solution, by means of pipe "d" and of pump N is conveyed to the top of the absorber A, after being adequately cooled in the cooler C.

The steam issuing from the secondary column is later on utilized according to two alternatives: according to the first alternative it is conveyed to the equipment for heating by direct contact the water feeding the boiler, as more clearly shown in FIG. 2; otherwise, on the basis of the second alternative, it is conveyed, by means of pipe "v" to the additional secondary column S as indicated in FIG. 1, where it is then utilized to regenerate a fraction of solution extracted, by means of pipe "f" at the bottom of the higher section Z of the main column.

It is convenient the said fraction be withdrawn from the bottom of the higher section Z of the column, after it has travelled a certain height of the column, and this for the reasons specified hereinafter in paragraph 7, and, at any rate, in such a way that it could release there a certain amount of $CO_2$ and/or $H_2S$, thus increasing the amount of said desorbed impurities and making them available under pressure; but said secondary fraction, although with lesser efficiency, could be withdrawn also from the exhausted solution before the main column, as indicated by the dotted line y.

Said secondary fraction is withdrawn by means of pipe "ic" and taken up from the pump Nc, once heated and pre-regenerated with the expansion steam, and brought back to the main regeneration column as indicated by the dotted line in FIG. 1 or, alternatively, as specified and preferred in the present invention, it is conveyed by means of pipe "e" to the column I, where it mixes with the solution coming from the expansion chamber E and together with the same is conveyed again to the absorber A.

The amount of the secondary fraction of solution delivered to column S is controlled so that it can be regenerated there almost in the same way as the solution coming from the bottom of the column P and from the expansion chamber.

It should be remarked, however, that the steam fed into column S is contaminated by small amounts of $CO_2$ and/or $H_2S$ desorbed in column I, wherefore the control of the secondary fraction delivered to column S ought to be calculated every time, according to the various cases of application of the present invention, with particular reference to the following.

When it is deemed convenient, the regenerated fraction is extracted at the bottom of the column S and, instead of being conveyed to the top of the secondary column I, may be conveyed directly to the absorption step; in this case it is expedient to envisage a two stage absorber instead of the one stage absorber considered in FIG. 1.

It should be observed that the additional secondary column S is normally placed above the secondary column I, forming a single column with the latter, but in FIG. 1, as well as in other Figures, the column S has been presented, for reasons of greater clarity, as distinct and separated from column I.

a. The improvement of the regeneration degree of the solution in the secondary column has been the object of measurements and experimental ascertainments which are reported in Table 1.

Table 1

| Initial carbonation degree | Final carbonation degree after supply the under-mentioned amount of kg steam/cu.m of solution | | | | | |
|---|---|---|---|---|---|---|
| | 20 | 30 | 40 | 60 | 80 | 100 |
| 20% | 18% | 17.2% | 16.5% | 15.3% | 14.5% | 14% |
| 30% | 26% | 24.5% | 23.2% | 21% | 18.8% | 17% |
| 35% | 30% | 28% | 26% | 23.2% | 21% | 18.8% |
| 40% | 33.5% | 31% | 28.5% | 25% | 22.5% | 20% |

The runs have been carried out with a potassium carbonate solution activated by glycine, having a concentration of 250 g/l of $K_2O$ and 50 g/l of glycine. In effect, it must be remarked that the solution is first regenerated in column P and then in column I by means of two separated and distinct amounts of steam, whose regenerative effects have been appropriately experimentally controlled and also by calculation.

From Table 1 it can be verified that the improvement of the regeneration in column I is remarkable and conspicuous. Moreover, the more the solutions coming from column P have been regenerated in an incomplete way, the more the improvements is sensible.

Furthermore it can be remarked that in the present embodiment, as well as in those that follow, the prevailing part of $CO_2$ and/or $H_2S$ is desorbed in the main column under pressure (wherein the solution, in the practical cases, enters with a carbonation degree equal to 70–85%) wherefore the present embodiment has the advantages, with respect to the method of the said copending Application, of being able to produce under pressure, up to 80–95% of the $CO_2$ and/or $H_2S$ desorbed.

b. Besides, it can be remarked that in the present embodiment, as well as in the following ones, in numerous practical cases, the heat supplied from the outside for the functioning of the purification cycle is the one which is contained in the process gas.

This gas travels first through the main reboiler $R_1$ located at the bottom of the main regeneration column, wherefrom it issues at a temperature of about 135°–145° C because of the fact that the pressure has increased in the main column the boiling temperature of the solution; subsequently it travels through the secondary reboiler $R_2$ located at the bottom of the secondary column operating at a lower pressure, where it can release its residual heat (down to 115°–125° C, which corresponds to about 10–20% of the total heat released by the process gas).

As an alternative, the process gas, for having travelled through the reboiler $R_1$ can be conveyed at a high level of the main column P to release its heat either by means of a reboiler or by a heater (not shown in FIG. 1) to the solution entering said column, which solution has in the present invention a temperature, lower at the top than at the bottom.

2. A different and more convenient version of the embodiment of paragraph 1 is illustrated in FIG. 2.

It also considers other improvement devices.

The absorption column is divided into two zones $A_1$ and $A_2$; the upper zone $A_1$ is intended for the chemical absorption of the impurities contained in the gaseous mixture to be purified or, at least, of the substantial part of them; the lower zone $A_2$ is intended instead mainly for the physical absorption of the heat contained in said gaseous mixture to be purified. This construction is disclosed in French Pat. No. 2,014,591. The solution conveyed to the top of the absorber, while travelling the zone $A_1$, increases substantially its temperature because of the heat of reaction; it is in part extracted from the bottom of the zone $A_1$ and conveyed, by means of pipe "$m$" to the top of the main regeneration column p; the remaining part of the solution continues to flow down into the lower zone $A_2$ where it absorbs the heat contained in the gaseous mixture to be purified, is thus heated and is then conveyed at an intermediate level of the above mentioned main regeneration column, by means of pipe "$n$."

The advantages of this embodiment are fundamentally two: the first consists in the fact that the chemical absorption of the impurities to be eliminated is effected at temperatures not exceedingly high, with known advantages; among other things, the solution will absorb, on an unitary basis, a greater volume of impurities; the second consists in the fact that the efficiency of the regeneration in the main column is improved. In fact it can be observed that the exhausted solution to be regenerated, conveyed in the form of two subdivided fractions at two different heights of the column, establishes therein two temperature levels.

The heat recovery at the top of the column will be facilitated by the lower temperature there established; the expansion of the solution conveyed hotter to an intermediate height of the column, favors the regeneration of the overlying solution.

As in the preceding embodiment illustrated in FIG. 1, the solution will be regenerated with a lesser supply of heat, that is, in an incomplete way; subsequently it is conveyed by means of pipe "$a$" to the secondary column I wherein its regeneration will brought to completion by means of the steam produced by expansion of the solution, according to what has been specified in reference to FIG. 1. The solution is then extracted from the secondary column I and conveyed, by means of pipe "$d$" and pump N, to the upper zone $A_1$ of the absorber.

At this point, in the embodiment illustrated in FIG. 2, two other improvements are utilized; the first consists in the fact that the secondary column operates in equicurrent, that is the solution extracted from the main column is conveyed to and expanded at the top of the secondary column I; the steam produced by the expansion flows down along the column in a current directionally concomitant with the solution. This is allowed by the fact that the solution has been previously regenerated and therefore the curve of the vapor tensions of the solution becomes very flat; under these conditions the regenerations in counter current and in equicurrent are not very different in functioning.

The second improvement consists in the fact that the secondary reboiler R2 (which in FIG. 1 was located at the bottom of the secondary column), is eliminated. In fact the heat related to that secondary reboiler remains within the gaseous mixture to be purification, which is conveyed, by means of pipe "z" to the zone $A_2$ of the absorber, but it does not interfere with the chemical absorption within the zone $A_1$ because it is absorbed in the zone $A_2$ and is brought back to the main regeneration column, without any loss.

c. The practical applications of the embodiment illustrated in FIG. 2 are reported, instead of in a single example, in the several cases of application summarized in Table 2.

Under consideration is a plant for removing $CO_2$ from 151,000 Ncu.m/hr of a gaseous mixture at 18.25% $CO_2$, at 28 absolute atmospheres, by means of a potassium carbonate solution activated by glycine (250 g/l $K_2O$; 50 g/l glycine).

Similar examples can be obtained with any other type of solution, including the ethanolamine solutions.

In all the above mentioned cases it was considered that the main column operates at 2.1 absolute atmospheres and at a temperature of 127° C at the bottom.

The effective supplies of outside heat expressed as kg steam/cu.m of solution are indicated in the first row 1 (1 kg steam = 540 Cal); the carbonation degree of the solution extracted from the main column is indicated in the second row 2; the carbonation degree of the solution extracted from the secondary column is indicated in the third row 3; the heat supply which would have been necessary for obtaining the regeneration degree of the third row from a solution submitted to a normal regeneration is indicated in the fourth row 4; the heat saving achieved is indicated in the fifth row 5; the heat consumption/Ncu.m $CO_2$ is indicated in the sixth row 6; the $CO_2$ fraction produced under pressure is indicated in the seventh row 7; the temperature of the vapors issuing from the secondary column and conveyed to the heating of the water feeding the boiler is indicated in the eighth row 8; and, finally, the flow rate of the solution (the pick-ups are of about 32–34 vol. $CO_2$/vol.solution) is indicated in the ninth row 9.

Table 2

| | | | | | | |
|---|---|---|---|---|---|---|
| 1) | 45 | 50 | 55 | 65 | 75 | kg/m3 |
| 2) | 32.6 | 31.5 | 30.2 | 28.2 | 26.5 | % carb. |
| 3) | 27.5 | 26.5 | 26 | 24.5 | 23.5 | % carb. |
| 4) | 69 | 75 | 79 | 90 | 103 | kg/m3 |
| 5) | 35% | 33.5% | 30% | 28% | 27.5% | saving |
| 6) | 765 | 845 | 930 | 1034 | 1193 | Cal/Nm3 $CO_2$ |
| 7) | 90.3 | 91.2 | 92.44 | 93.5 | 93.85 | % |
| 8) | 97.1° | 97.3° | 97.4° | 97.6° | 97.7° | ° C |
| 9) | 859 | 859 | 859 | 808 | 808 | m3/h |

From the data reported in Table 2 it can be observed — row 7 — that the $CO_2$ fraction desorbed under pressure is remarkable, always greater than 90%; that the embodiment permits to regenerate the solution almost to completion; with a supply of effective heat, for instance, of 45–75 kg steam/cu.m sol. —row 1— regeneration degrees corresponding to heat supplies respectively of 69–103 kg steam/cu.m sol. —row 4— are achieved. In the case of the last column (75 kg steam/cu.m sol.) the use of ethanolamine solutions with an almost complete purification, is made possible.

d. in FIG. 2 is shown also another advantage of the present invention. It lies in the fact that the steam issuing from the secondary column by means of pipe "v" is particularly suitable for the direct contact heating of the water feeding the boilers, which, as known, in a greater part of the cases, are connected with the $CO_2$ and/or $H_2S$ purification plants, reforming and conversion plants, etc. In fact said steam, besides having a rather high temperature (row 8 of Table 2), has a high degree of purity because it comes from the expansion of the solution regenerated in the main column, that is from a solution which, has been previously regenerated and thus highly purified with respect to any gaseous or volatile impurity, such as $NH_3$, methylamino, HCN, organic and aromatic compounds etc. contained in the mixture to be purified (which impurities, as known, render difficult the utilization of the condensates originating from it).

Therefore, it is clear that said steam can be conveniently used under the previous by mentioned conditions, to heat the water feeding the boiler, by direct contact between said steam and the water to be heated.

In FIG. 2 is shown one of the devices that can be used for the above mentioned direct contact heating (obviously, similar arrangements are achievable also in the other embodiments of the present invention).

The steam issuing from the secondary column I is passed first through the separator D, which is intended to prevent the eventual draggings of the solution, and subsequently through column S, which consists of two superimposed zones, each one supplied with suitable contact material. In the lower zone B the steam undergoes a cooling, by means of the coil C (or by means of other equipment for thermal transmission) sufficient to condense in part in order to satisfy the water balance of the depurative cycle. Such condensation prevents the small draggings of the solution and allows an important washing of the steam. This last, by now completely free from liquid draggings, is brought into contact, in the upper zone S, with the water to be heated.

This one is fed at the top, by means of pipe "t" and reaches rapidly a temperature of 96°–98° C. Finally it is extracted from the bottom by means of pipe "w" and conveyed to a conventional degasser, which, as known, is intended to eliminate the $CO_2$ and $O_2$ impurities. The excess steam, together with the $CO_2$ desorbed in the secondary column I, is discharged on the outside, by means of pipe "q."

3. Reference is now made to FIG. 3 wherein the present invention is applied to a two stage purification cycle.

In this embodiment, the main regeneration column, operating at a higher pressure, comprises two regeneration stages, that is a first stage $P_1$, from the bottom whereof the so called "semi-regenerated" fraction of solution is extracted, and a second stage $P_2$ from the bottom whereof the so called "regenerated" fraction of solution is extracted.

The secondary column also comprises two regeneration zones, respectively, upper $I_1$ and lower $I_2$, as indicated in FIG. 3.

The additional secondary column S consists of a single stage column.

The absorber comprises a first a stage $A_1$ and of a second stage $A_2$.

The regenerated fraction, extracted by means of pipes $a_2$ from the bottom of the second stage $P_2$ of the main column, is conveyed to the expansion chamber $E_2$, wherein it develops steam which is conveyed, by means of pipe "$b_2$," to the bottom of the lower zone $I_2$ of the secondary column, while the solution, after expansion, is conveyed by means of pipe "$c_2$" to the top of the zone $I_2$, wherein it is regenerated in countercurrent both by the steam admitted by means of pipe "$b_2$," and by that developed from the reboiler $R_2$ located at the bottom of the column, and also by the steam evolved by the semi-regenerated solution in the chamber $E_1$, as will be explained hereinafter.

The solution, thus thoroughly regenerated, is extracted by means of pipe "$d_2$" and of pump $N_2$ and conveyed to the top of the absorber $A_2$, after having been adequately cooled in the cooler $C_2$.

The same operation is repeated for the semi-regenerated fraction. This last is extracted by means of pipe $A_1$ from the bottom of the first stage of the main column and is conveyed to the expansion chamber $E_1$, wherein it develops steam which is conveyed, by means of pipe "$b_1$," again at the foot of the lower zone $I_2$ of the secondary column, together with the steam developed in the chamber $E_2$. The semi-regenerated fraction, after expansion, is conveyed, by means of pipe "$c_1$" to the top of the zone $I_1$, where it is regenerated in countercurrent with the steam coming from the underlying regeneration zone $I_2$, as clearly shown in FIG. 3. Finally the semi-regenerated fraction is collected at the bottom of the zone $I_1$, wherefrom it is extracted, by means of pipe "$d_1$" and of pump $N_1$, and conveyed to the top of the first stage absorber $A_1$, after it has been eventually cooled in the cooler $C_1$.

The functioning of the additional secondary column S is similar to that relating to the one stage purification cycle illustrated in FIG. 1 and described in paragraph (1).

A secondary fraction of solution is withdrawn by means of pipe "$f$" from the bottom of the upper section Z of the main column and fed to the secondary column S where it is regenerated with the steam coming from the top of the zone $I_1$ via pipe $v$. A secondary fraction can also be withdrawn from the exhausted solution before passing through the main column as indicated by the dotted line "$y$." After having travelled through the secondary column, this fraction can be partially returned to the main column by the pump $N_c$ pipe "$i_c$" shown in dotted line in the drawing in which case the upper zone Z of this column can be by-passed.

As regards the repartition of the heat of the process gas between the reboiler $R_1$ and the reboiler $R_2$, that which was previously said in paragraph (lb) is still valid.

It must be emphasized here in a fundamental manner that the semi-regenerated fraction receives, in the zone $I_1$ of the secondary column, a very important improvement of the regeneration degree. This depends both on the abundance of steam coming from the underlying zone $I_2$ and also and basically on the fact that the improvement in the regeneration degree, shown in the previous Table, is so much greater the more the solutions have previously been scarcely regenerated, as is in the case of the semi-regenerated fraction. This fact constitutes a remarkable advantage of the two stage cycle in comparison with the single stage cycles.

4. With reference to FIG. 4, another embodiment of the present invention is now described, which consists in conveying, substantially in its totality, the exhausted solution to be regenerated, first in the secondary column I at a lower pressure, wherein it is treated by the steam produced in the expansion chamber E, of the regenerated solution extracted from the main column P; and subsequently conveyed, by means of the pump Nc and of pipe "$i$" to the above mentioned main column P, where it completes its regeneration by means of the outside heat supplied by the reboiler $R_1$. In said column the pressure is controlled as specified in the said copending Application, by availing oneself of the diagram of FIG. 8. The solution after having been regenerated under pressure in the column P, is extracted by means of pipe "$a$" and conveyed to the expansion chamber E, wherein it expands producing steam.

Said steam is conveyed to the secondary column I to pre-heat and pre-regenerate the exhausted solution coming from the absorber, as previously said. The solution, instead, is conveyed, by means of pipe "$c$" and the pump N, to the absorber, after having been conveniently cooled in the cooler C. As known the amount of steam discharged on the outside from the top of the main column is really neglibible.

The above described embodiment is particularly indicated in the cases wherein the absorption is effected at relatively low temperature (40°-90° C) and in the cases wherein the gaseous mixture to be purified contains, together with the $CO_2$, sensible amounts of $H_2S$. In fact, this embodiment shows the advantage that almost the totality of the $H_2S$ eliminated is desorbed in the secondary column, wherefore said $H_2S$ reaches, at the outlet of said column, a high concentration which allows its easier utilization in the known Claus furnaces.

e. In the present embodiment, two alternatives are possible depending on the preference of prevalently using the steam produced in the expansion chamber E either to heat or to preregenerate the exhausted solution conveyed to the secondary column I.

In the first alternative, the absorption is effected at relatively low temperature, and in such a way that the solution may then be heated in the secondary column S by means of the aforesaid steam, at least to 90°-95° C. There is the advantage of partially or totally eliminating the known heat exchanger between the exhausted solution and the regenerated solution existing in the purification cycles of the technique known to-date.

On the contrary, in the second alternative it will be convenient to develop the application plan of the present embodiment so that the solution be pre-regenerated as much as possible in the column I, that is till it reaches a carbonation degree exceeding that of the critical point related to the regeneration in the main column P. The meaning of the aforesaid "critical point," that is the point that determines the amount of heat which it is necessary to supply in order to obtain a pre-established regeneration degree, has been made clear in the aforesaid copending Application—paragraph 2. The present embodiment avails itself, in this case, of the observation that, by pre-regenerating the solution so that the aforesaid critical point is exceeded, the amount of heat necessary for obtaining the aforesaid pre-established regeneration degree in the main column, is remarkably reduced. In practice, in the case of the $CO_2$ absorption, said result is reached when, in the preregenerated solution issuing from the secondary column, the alkali present as bicarbonate does not exceed by more than 20% the alkali present as bicarbonate in the regenerated solution in the main column. To make it clearer, this means that in relation to a carbonation degree of the solution issuing from the main column P of 10%, 20%, 30%, respectively, the carbonation degree of the pre-regenerated solution in the secondary column I must not be higher than 30%, 40%, 50%, respectively.

As it will be made clearer in Example 4, the present embodiment renders it possible to achieve both the aforesaid advantages, that is, not only to eliminate the previously mentioned heat exchanger, but also to regenerate the solution in a better manner than that corresponding to the actual supply of heat from the outside.

f. In many practical cases it is often preferable to utilize the present embodiment for a further decrease of heat consumption. In said cases the secondary column I, in FIG. 4, is completed with the addition at the bottom of the additional secondary column S. The steam produced in chamber E is conveyed to the foot of said additional column S (and no more to the bottom of the secondary column I); corespondingly a part of the solution pre-regenerated in the column I is conveyed, by means of pipe "$v$," to the underlying column S and its amount is controlled so that it is regenerated at the regeneration degree of the solution issuing from the main column P.

The solutions thus equally regenerated, and extracted respectively by means of pipes "$c$" and "$b$," are combined and conveyed to the absorber A.

It should be noticed here that the embodiment illustrated in FIG. 4 can be modified and improved, in addition to the adjunction of column S, by combining it with the embodiments and devices herein described and illustrated in FIG. 1 (one stage cycles) and especially in FIG. 3 and 5 (two stage cycles). in all the above mentioned procedures it is in fact sufficient that the exhausted solution be entirely conveyed to the column S by means of pipe "$y$," shown in dotted line, and after having travelled the said column, be partly taken up by the pump Nc and pipe "$ic$", shown in dotted line in the drawings, and brought back to the top of the column P (in this case the upper zone of this column should be eliminated).

g. A remarkable improvement of the present embodiment is achieved by the use of the ejector $Ej$, indicated by a dotted line in FIG. 4.

As in the French Pat. No. 2,020,586, the exhausted solution issuing under pressure from the absorber, is conveyed to the said ejector, this originating a depression which is applied to the chamber $E$, travelled by the regenerated solution before the latter be conveyed to the cooler C and to the absorber A. Due to the depression, a steam flow is evolved from the solution; said steam is aspirated by the ejector and is utilized for heating the exhausted solution conveyed to the top of column through conduit. The steam extraction is strongly facilitated by the fact that said steam is condensed by the solution.

5. Another embodiment of the present invention is now described. It consists of conveying the exhausted solution to be regenerated, in its totality, to the main column P, and of extracting, at different heights of the main column at a higher pressure, two or more fractions of solution of different carbonation degree and of delivering them at different heights of the secondary column at a lower pressure; the steam that each fraction develops in expanding within said column, is utilized to regenerate the overlying fractions at a higher carbonation degree.

FIG. 5 refers to a two stage cycle which is the most convenient for the present embodiment in which, besides the absorber and the main column, also and fundamentally the secondary column is a two stage column.

In FIG. 5 the solution to be regenerated is conveyed to the main column, where the pressure is controlled according that which has previously been said. The so called regenerated fraction, coming by means of pipe "$a_2$" from the bottom of the second stage $P_2$ of the main column, is fed at the top of the regeneration zone $I_2$ of the secondary column and is regenerated by the steam developed by the reboiler $R_2$ (where the process gas releases the heat which it could not release in the reboiler $R_1$ of the main column). The solution, thus improved in its regeneration, it taken up by the pump $N_2$, by means of pipe "$d_2$" and conveyed to the top of the second stage $A_2$ of the absorber, after having been cooled in the cooler $C_2$.

The so called semi-regenerated fraction, coming from the first stage $P_1$, by means of pipe "$a_1$," is fed at the top of the zone $I_1$ of the secondary column where it is regenerated by the steam coming from the underlying zone $I_2$, that is by the steam produced from the reboiler $R_2$ and by that produced by the regenerated fraction which is expanding therein. It is extracted then from the bottom of the zone $I_1$ and conveyed by the pump $N_1$, by means of pipe "$d_1$," to the first stage $A_1$ of the absorber, after a possible cooling in the cooler C. The steam after having been utilized in the zone $I_1$, is conveyed by means of pipe v to the overlying additional secondary column S where it is used for regenerating the almost exhausted fraction of the secondary solution, extracted from the upper zone Z of the main column P, by means of pipe "$f$," according to the procedure previously described with reference to FIG. 3. The secondary fraction with less efficiency can also be withdrawn from the exhausted solution before passing through the main column as indicated by the dotted line "$y$." After travelling through the said secondary column, the fraction can be partially returned to column P by pump $N_c$ and pipe "$i_c$" shown by the dotted line in the drawing. In this case the upper zone Z of this column should be by-passed.

It is observed that the thermal efficiency of the present embodiment increases, as the number of fractions of solution extracted from the main column and conveyed to the secondary column increases. In practice it is suggested the extraction of two fractions of solution for the one stage cycle and of three fractions for the two stage cycles. The two stage cycle is preferred also because of the fact that besides the lesser amount of heat required by such a cycle, there is added the reduction of heat allowed by the present invention.

6. FIG. 6 illustrates a simplified version of the two stage cycle embodiment described in paragraph 5. The description of said version can be abridged by referring to the preceding Figures.

It should be observed firstly that the so called regenerated fraction of solution extracted from the second stage $P_2$ of the main column by means of pipe "$a_3$" is conveyed to the expansion chamber E, where it expands with production of steam; subsequently it is conveyed to cooler $C_2$ and finally, by means of the pump $N_2$ to the second stage absorber $A_2$. The steam produced by the expansion is conveyed from the chamber E to the bottom of the secondary column I.

The secondary reboiler $R_2$ (shown in the preceding Figures) has been eliminated; the gaseous mixture issuing (at 135°–145° c) from the reboiler $R_1$ at the bottom of the main column, is directly conveyed to the absorber, where it heats the absorbing solution.

h. Finally, it should be noted that the so called "semi-regenerated" fraction extracted from the first stage $P_1$ of the main column, is not conveyed to the expansion chamber according to the procedure illustrated in FIG.

3, but it is instead subdivided into two parts, by means of pipes "$a_1$" and "$a_2$" which are directly fed to the secondary regeneration column I at different heights. As it is shown in FIG. 6, the solution delivered through pipe "$a_2$" is regenerated with the steam developed by the expansion of the solution delivered through pipe "$a_1$"; a greater efficiency can be obtained by subdividing the solution in a greater number of fractions. The efficiency of this embodiment is certainly lesser than that of the embodiment illustrated in FIG. 3, that is with the use of the expansion chamber, but this embodiment has the advantage of a remarkable simplicity. Said semi-regnerated fraction is extracted from the bottom of the column I and conveyed by the pump $N_1$ to the first stage $A_1$ after optionally cooling in the cooler $C_1$.

The method of expansion illustrated in FIG. 6 for the semi-regenerated solution of a two stage cycle, can obviously be applied also to other fractions and types of solutions and also to the one stage cycles.

7. Another embodiment of the present invention is illustrated in FIG. 7. This embodiment differs from the preceding ones because the main column P releases part of its heat to the secondary column S, by means of a steam flow extracted by means of pipe g at an intermediate height of said main column, and delivered at an intermediate height of said secondary column for the purpose of regenerating the solution flowing down therein. This embodiment is utilized also as a modification of the preceding embodiments when it is desirable to avoid that the solution may attain temperatures exceedingly high, for instance temperatures not allowed by the chemical composition of the filling material.

For a better understanding of that which has been previously set forth, the following observations, drawn from the industrial application of the present invention, are valid.

The solution coming from the absorber A and fed hot at the top of the main column P, notwithstanding an appropriate control of the pressure of the column, very often has a temperature slightly higher than the boiling temperature corresponding to its carbonation degree. Therefore while it is flowing down along the main column, its temperature tends to decrease and in any case, does not increase till the solution is regenerated and reaches a carbonation degree whose boiling temperature corresponds to the actual temperature of the solution.

Under these conditions, the $CO_2$ desorption in the upper zone Z of the regeneration column occurs with a limited consumption of heat and that is, practically, with the only heat of reaction. This is the reason why in paragraph 1, with reference to FIG. 1, the secondary column is fed, by means of pipe "$f$," with a fraction of solution extracted from the main column after the aforesaid upper zone Z.

The solution flowing down along column P, increases in temperature and is regenerated until it attains the critical regeneration point, as defined in the aforesaid co-pending Application.

The $CO_2$ content in the desorbent steam, which was very high at the top of the column, decreases gradually, until it annuls itself at the bottom of the column; therefore, the steam extraction from the main column may conveniently occur only before the critical point of regeneration, that is when the steam has already achieved its regenerative function in correpondence with a aforesaid critical point.

Consequently in the present embodiment it is suggested that at an intermediate height of the main column, that is in the proximity of the aforesaid critical point, a steam flow should be with drawn in the amount which is deemed necessary for decreasing the temperature of the solution in the column; said steam is then conveyed, by means of pipe "$g$" at an intermediate height of the secondary column and utilized to regenerate the solution flowing down therein.

In FIG. 7 as well as in the preceding Figures, the solution regenerated in the main column is extracted therefrom and expanded in the chamber E, and the resulting steam is conveyed to the secondary column by means of pipe "$b$." The solution regenerated in the secondary column and the solution expanded in the chamber E are taken up by the pump N and conveyed to the absorber A, after appropriate cooling in the cooler C.

As before said, this embodiment may be utilized in the preceding embodiments whenever it is desired to decrease therein the amount of solution and the temperature of the solution in the main column P. The steam extracted from the main column is conveyed either to the secondary column or to the additional secondary column, according to the case envisaged. 8. The two stage cycle, moreover, is remarkably improved in convenience by the expedient according to which the steam produced by the expansion of the regenerated solutions extracted from the main column and the heat furnished by the secondary reboiler, either separately or jointly, are utilized firstly to improve the regeneration of that fraction of regenerated solution intended to be conveyed at the top of the second stage of the absorber, and only subsequently are utilized for regenerating the solution intended for the first stage of the absorber.

9. Another particular application of the present invention is that wherein the steam developed by the expansion of the solutions extracted from the main column (and, in any cases, the heat contained in them) is utilized to desorb the $CO_2$ and/or the $H_2S$ from the absorbing solutions circulating in another and different purification plant for $CO_2$, $H_2S$ and other impurities. Other schemes of utilization are those wherein the above mentioned steam is utilized outside the purification plant wherefrom it comes, as, for instance, the utilization of said steam in a conversion plant for carbon monoxide CO operating under low pressure, or in a reforming-or cracking plant for methane or other hydrocarbons, operating at low pressure. Said schemes, not envisaged in the aforesaid co-pending Application, pertain to it inasmuch as they are concerned, at any rate, with the utilization of the heat that the new regeneration method, object of the present invention, permits to recover.

Finally the present invention considers also the improvements, already suggested in the Parent Patent, concerning the application of vacuum or of the treatment with inert gases to the solutions coming from the main column and treated in the secondary column or in the additional secondary column.

Finally it must be noted that the embodiments described in the present invention can be improved, similarly to the method described in U.S. Pat. No. 3,962,404 using the procedure disclosed in the French Pat. No. 2,014,591 consisting in establishing in the absorbing column two zones, that is an upper zone intended for the chemical absorption of the $CO_2$ and/or $H_2S$ and other impurities or of an important part of the latter, and a lower zone intended for the physical absorption of the heat contained in the gaseous mixture to be depurated (said lower zone may constitute either a single unit with the upper zone, or it can be distinct and separated therefrom); in extracting a (cooler) fraction of the absorbing solution from the upper zone and conveying it to the secondary regeneration column; in extracting the remaining (hotter) fraction of the solution from the lower zone of the absorber and conveying it to the principal regeneration column.

In this manner the chemical absorption in the upper zone of the absorber is achieved at a relatively low temperature, thus improving both the absorption efficiency and, also, the pick up of the absorbing solution. At the same time, the heat contained in the gaseous mixture to be purified is concentrated into the solution extracted from the lower zone of the absorber and used more completely in the main regeneration column according to the basic concept of the present invention.

The embodiment illustrated in FIG. 2 has been further illustrated by the five examples summarized in Table 1.

The present invention now illustrated by some other examples, for which it has been deemed appropriate to take into consideration the same capacity (151,000 Ncu.m/hr), the same operative pressure (28 absolute atmospheres) and the same initial content of $CO_2$ (18%) and finally the same heat supply (720-740 Cal/Ncu.m $CO_2$. This last value could also be considerably decreased (to 550-580 Cal/Ncu.m $CO_2$), but it has been fixed at 720-740 because this is a heat consumption which, in practice, takes into account that some additional heat is required for other purposes, like that of preheating the water feeding the boiler.

Under the aforesaid parity of conditions, the different Examples show the improvement of the regeneration degree of the solutions obtainable in the various alternatives of the present invention.

The following Examples refer to a potassium carbonate solution containing 250 g/l $K_2O$ and 50 g/l glycine.

EXAMPLE 1

In a one stage purification cycle, as shown in FIG. 1, the process gas (151,000 Ncu.m/hr; 28 absolute atmospheres; 18% $CO_2$) is conveyed at 166° C to the first reboiler —in the main column—wherein it releases 13,900,000 Cal/hr; it issues at 141° C and enters the second reboiler —in the secondary column— wherein it releases 6,100,000 Cal/hr; it issues at 120° C and enters at said temperature the absorber. From said absorber the solution issues at 108° C. The flow rate is 1040 cu.m/hr of a 250 g/l $K_2O$ and 50 g/l glycine solution, which is conveyed to the main regeneration column and after having travelled a short portion of the column is divided into a fraction of 572 cu.m/hr which continues to flow down the column (main fraction) and a fraction of 468 cu.m/hr which is conveyed to the additional secondary column (secondary fraction).

The pressure in the main column is set at 1.53 absolute atmospheres at the top, so that, in correspondence to the solution temperature of 108° C, the amount of steam which accompanies the $CO_2$ and/or the $H_2S$ as flashing steam and also as stripping steam, is reduced to 0.6 kg $H_2O$/Ncu.m $CO_2$.

As known from the aforesaid co-pending Application, the solution at the bottom of the main column has a temperature of 117.5° C (pressure 1.70 absolute atmospheres) and a carbonation degree of 33%. The solution expands in the expansion chamber to about 1 absolute atmosphere, cooling to 108° C and evolving 9,350 kg steam/hr; it is then conveyed to the secondary column where it is regenerated by both the steam coming from the expansion chamber and the steam coming from the secondary reboiler (11,300 kg/hr), on the whole 20,650 kg/hr.

The exhausted secondary fraction, coming from the upper part of the main column at a rate of 468 cu.m/hr, is subdivided into two parts admitted at different heights of the additional secondary column (so that the upper part is treated with the steam developed by the expansion of the lower part), where it is treated with the steam coming from the secondary column and subsequently conveyed to the secondary column.

The secondary fraction is regenerated at the bottom of the additional secondary column at a 35.5% degree of regeneration; the combined main fraction and secondary fraction have a 29% regeneration degree at the bottom of the secondary column.

Conclusively, the regeneration degree of the main fraction is improved from 33% to 29%. The secondary fraction is also regenerated to the same value.

EXAMPLE 2

This Example is similar to the preceding one, with the difference, however, that the secondary reboiler is eliminated and is replaced by a heater at the top of the main column.

The thermal conditions are changed as follows:

The process gas enters into the primary reboiler at 165° C releasing 15,675 Cal/hr; it issues at 136° C and enters the aforesaid heater where it releases 4,200,000 Cal/hr, heating the main fraction from 108° C at the absorber outlet, up to 115° C. The solution is divided into a main fraction of 645 cu.m/hr and a secondary fraction of 395 cu..m/hr.

The pressure in the main column is set at 1.90 absolute atmospheres at the top and 2.05 absolute atmospheres at the bottom, where the boiling temperature is 124.5° C.

The steam is evolved by expansion of the regenerated fraction at a rate of 18,630 kg/hr. The regeneration degree of the main fraction of the outlet of the main column is 33%. The regeneration degree of the combined main fraction and secondary fraction at the outlet of the secondary column is 30%. That of the secondary fraction at the outlet of the additional secondary column is 35.5%.

EXAMPLE 3

In a two stage purification cycle, as shown in FIG. 3, the process gas (151,000 Ncu.m/hr; 28 absolute atmospheres; 18% $CO_2$) enters at 166° C the first reboiler where it releases 13,900,000 Cal/hr, issues at 141° C and enters the second reboiler, where it releases 6,100,000 Cal/hr. It issues at 120° C and enters at that temperature the first stage of the absorber. From said absorber it issues at 108° C; the flow rate is of 1040 cu.m/hr of a 250 g/l $K_2O$ and 50 g/l glycine solution. The solution is conveyed to the main column and after a short portion of said column, it is divided into a main fraction (572 cu.m/hr) and a secondary fraction (468 cu.m/hr).

The pressure is set at 1.55 absolute atmospheres at the top of said column, and thus, as in Example 1, the amount of flashing and stripping steam is reduced to 0.6 kg steam/Ncu.m $CO_2$.

The regenerated fraction of the solution at the bottom of the second stage of the main column has a temperature of 119° C, a flow rate of 260 cu.m/hr and a 23.5% regeneration degree. It expands in its expansion chamber, cooling down to 108° C and evolving 4,937 kg steam/hr.

The semi-regenerated fraction of the solution, at the bottom of the first stage of the main column, has a temperature of 116,2° C, a flow rate of 312 cu.m/hr and a 40.9% regeneration degree. It expands in its expansion chamber, cooling down to 108° C and producing 4,417 kg steam/hr.

Besides this, a further amount of steam, equal to 11,296 kg/hr is produced by the second reboiler.

The aforesaid three amounts of steam (a total of 20,650 kg/hr) travel along the lower zone of the secondary column, regenerating the regenerated fraction, and subsequently the upper zone of the above mentioned column and finally the additional secondary column, regenerating, as shown in FIG. 3, the semi-regenerated fraction and the secondary fraction.

The regeneration degrees are the following: regenerated fraction at the outlet of the main column second stage: 23.5%; regenerated fraction at the outlet of the secondary column: 16% semi-regenerated fraction at the outlet of the main column first stage: 40.9%; secondary fraction at the outlet of the additional secondary column: 37%; semi-regenerated and secondary fraction combined at the bottom of the secondary column upper zone: 31.5%.

Conclusively, besides a noticeable reduction of the heat supply in the present Example, a remarkable improvement of the regeneration degree of the solutions (especially the semi-regenerated one) is obtained. This result means a better depuration of the gas at the absorption outlet and/or a sensible reduction of the size of the absorption equipment.

EXAMPLE 4

This Example differs from the preceding ones because the secondary exhausted fraction, which in said Examples, after having travelled the additional secondary column was conveyed to the secondary column, is instead taken up by a pump and re-conveyed to the top of the main column (instead of being conveyed to the secondary column).

This Example refers to a one stage purification cycle, wherein the absorber operates at low temperatures (63°-82.5° C) and wherein the present invention permits to eliminate the usual heat exchanger between the regenerated solution and the exhausted solution.

With reference to FIG. 1, the process gas (151,000 Ncu.m/hr; 28 absolute atmospheres; 18% $CO_2$) is conveyed at 181.5° C in the primary reboiler in the main column, where it releases 32,800,000 Cal/hr, issues at 136° C and enters the second reboiler of the secondary column where it releases 4,200,000 Cal/hr and issues at 120° C; subsequently it is conveyed to the absorption column.

From said column 845 cu.m/hr of exhausted solution are extracted at the temperature of 82.5° C, and are all conveyed into the additional secondary column where they are heated and pre-regenerated by the steam coming from the secondary column. The solution is taken up by a pump from the bottom of the additional secondary column and conveyed at the top of the main column; its temperature is of about 100° C.

The pressure in said column is set at 1.85 absolute atmospheres and at the bottom of the column the solution has a temperature of 121° C and a 27% carbonation degree. It is subsequently expanded in its expansion chamber, thus cooling to 108° C and evolving 17,400 kg steam/hr which are delivered at the bottom of the secondary column. From the secondary reboiler, at the bottom of the same column, 7,780 kg steam/hr are evolved, which together with those coming from the expansion, complete the regeneration of the solution to a 22.5% carbonation degree.

The solution is subsequently cooled to about 63° C and conveyed to the absorber wherefrom it issues at 82.5° C, heated at that temperature because of the heat of the reaction and of that released by the hot gas (120° C).

In the present Example, the heat exchanger between the exhausted solution and that regenerated has been eliminated; the heat supply is the usual one relative to a unitary charge of 32 vol. $CO_2$/vol. of solution and with the technique of the aforesaid co-pending Application, a 27% regeneration degree would be achieved, corresponding to a heat supply of 37,800 Cal/cu.m of solution. With the present invention, there is the further advantage that the regeneration degree is improved further on, up to 22.5%

As in the preceding Examples a 250 g/l $K_2O$ and 50 g/l glycine solution is utilized.

In case the ejector Ej is utilized, as in FIG. 4, the heat recovered from the regenerated solution (at 108° C) by means of said ejector, allows for the absorption to occur at a still lower temperature; the temperature of the exhausted solution coming from the absorber, instead of 82.5° C, may decrease to 65°-70° C.

We claim:
1. In a process for eliminating and recovering gaseous impurities such as $CO_2$, $H_2S$, $HCN$, $SO_2$ from a gaseous mixture containing them by an absorption technique carried out at a temperature of from 40° to 135° C, wherein said gaseous mixture is brought into contact with an alkaline absorbing solution selected from the group consisting of solutions of alkali metal carbonate, alkali metal carbonate solutions activated by glycine, an amino acid, ethanolamine or $As_2O_3$, amino acid solutions, ethanolamine solutions; solutions of alkali metal phosphates, sulfites, bisulfites and borates; and a regeneration step wherein the exhausted absorbing solution is regenerated by steam stripping and expulsion of the impurities previously absorbed, said regeneration step actually consisting of two columns, respectively a main column and a secondary column, the main column operating at a higher pressure than the secondary column, the improvement which comprises:
 a. conveying substantially all the exhausted absorbing solution to the main column and regenerating the solution therein an in incomplete manner by means of externally supplied heat;.
 b. conveying said solution to an expansion chamber and expanding said solution therein to thereby flash off steam;
 c. conveying expanded solution (b) to said secondary column and treating said solution therein with the steam produced by said expansion (b) to thereby complete the regeneration of the solution in said secondary column;
 d. extracting regenerated solution (c) from said secondary column and delivering it to the absorption stage;
 e. discharging the steam issuing from the top of the secondary column, as well as from the top of the main column, together with the impurities desorbed.

2. The process of claim 1, wherein the pressure of the main regeneration column is controlled in such a way as to establish, between the top and the bottom of said column, a temperature difference of 10°-45° C, depending upon the unitary amount of heat supplied to said column from the outside.

3. The process of claim 1, wherein the pressure of the main regeneration column is controlled in such a way that the steam issuing from the top thereof is in excess not greater than 1.5-3 times with respect to the amount corresponding to the equilibrium conditions prevailing at the top of said column.

4. The process of claim 1, wherein the steam issuing from the top of the secondary regeneration column is brought into direct contact with the water feeding a boiler, thus condensing and heating said water.

5. The process of claim 4, wherein the fractions of solution extracted from the main column are divided into at least two sub-fractions which are introduced at different heights of said secondary column.

6. In a process for eliminating and recovering gaseous impurities such as $CO_2$, $H_2S$, HCN, $SO_2$ from a gaseous mixture containing them by an absorption technique carried out at a temperature of from 40° to 135° C, wherein said gaseous mixture is brought into contact with an alkaline absorbing solution selected from the group consisting of solutions of alkali metal carbonate, alkali metal carbonate solutions activated by glycine, an amino acid, ethanolamine or $As_2O_3$; amino acid solutions; ethanolamine solutions, solutions of alkali metal phosphates, sulfites, bisulfites and borates; and a regeneration step wherein the exhausted absorbing solution is regenerated by steam stripping and expulsion of the impurities previously absorbed, said regeneration step actually consisting of two columns, respectively a main column and a secondary column, the main column operating at a higher pressure than the secondary column, the improvement which comprises:
  a. conveying substantially all the exhausted absorbing solution to the main column and regenerating it therein in an incomplete manner by means of externally supplied heat;
  b. conveying the solution (a) to an expansion chamber, and expanding the solution therein to thereby flash off steam;
  c. conveying the expanded solution (b) to the secondary column and treating said solution therein with the steam produced by the expansion (b) to thereby complete its regeneration;
  d. conveying steam issuing from said secondary column to an additional secondary column;
  e. extracting a fraction of solution from an upper zone of said main column and conveying it to said additional secondary column to thereby regenerate said fraction with said steam issuing from said secondary column;
  f. regulating the amount of the fraction (e) in such a manner that the fraction is regenerated to the same regeneration degree as the solution issuing from the bottom of said main column;
  g. combining said fraction (f) issuing from said additional secondary column and the fraction issuing from said main column and conveying said combined fractions to said secondary column wherein regeneration is completed;
  h. extracting the latter from said secondary column and delivering them to the absorption step.

7. The process of claim 6, wherein the pressure of the main regeneration column is controlled in such a way as to establish, between the top and the bottom of said column, a temperature difference of 10°-45° C, depending upon the unitary amount of heat supplied to said column from the outside.

8. The process of claim 6, wherein the pressure of the main regeneration column is controlled in such a way that the steam issuing from the top thereof is in excess not greater than 1.5-3 times with respect to the amount corresponding to the equilibrium conditions prevailing at the top of said column.

9. The process of claim 6, wherein the fractions of solution extracted from the main column are divided into at least two subfractions which are introduced to different heights of said secondary column.

10. The process of claim 9, wherein said fraction (f) treated in said additional secondary column is extracted from the additional secondary column by pumping, and delivered to said main regeneration column.

11. In a process for eliminating and recovering gaseous impurities such as $CO_2$, $H_2S$, HCN, $SO_2$ from a gaseous mixture containing them by an absorption technique carried out at a temperature of from 40° to 135° C, wherein said gaseous mixture is brought into contact with an alkaline absorbing solution selected from the group consisting of solutions of alkali metal carbonate, alkali metal carbonate solutions activated by glycine, an amino acid, ethanolamine or $As_2O_3$; amino acid solutions; ethanolamine solutions, solutions of alkali metal phosphates, sulfites, bisulfites and borates; and a regeneration step wherein the exhausted absorbing solution is regenerated by steam stripping and expulsion of the impurities previously absorbed, said regeneration step actually consisting of two columns, respectively a main column and a secondary column, the main column operating at a higher pressure than the secondary column, the improvement which comprises:
  a. using a two stage purification cycle comprising a two stage absorption column, a two stage principal regeneration column and a two stage secondary regeneration column;
  b. conveying substantially all said exhausted absorbing solution to the main regeneration column; extracting from the frist stage of said column a fraction of solution; expanding this fraction in an expansion chamber with production of steam; conveying said expanded fraction to the first stage of the secondary regeneration column, extracting said fraction from the latter and conveying it to said first stage of the absorption column;
  c. extracting the remaining fraction of solution from the second stage of said column, expanding the latter in a second expansion chamber with production of steam, conveying the expanded fraction to the second stage of said secondary regeneration column; extracting said remaining fraction from said second stage of the secondary column and delivering said fraction to the second stage of the absorption column;
  d. delivering the steam produced in said expansion chambers of (b) and (c) to the bottom of the secondary regeneration column, passing said steam through the two stages of said column and finally discharging said steam.

12. The process of claim 11, wherein the pressure of the main regeneration column is controlled in such a way as to establish, between the top and the bottom of said column, a temperature difference of 10°–45° C, depending upon the unitary amount of heat supplied to said column from the outside.

13. The process of claim 11, wherein the pressure of the main regeneration column is controlled in such a way that the steam issuing from the top thereof is in excess not greater than 1.5–3 times with respect to the amount corresponding to the equilibrium conditions prevailing at the top of said column.

14. The process of claim 11, wherein the steam issuing from the top of the secondary regeneration column is brought into direct contact with the water feeding a boiler, thus condensing and heating said water.

15. The process of claim 11, wherein the purification cycle is a two stage cycle; the heat necessary for the functioning of said cycle is the one contained in the gaseous mixture to be purified; said gaseous mixture to be purified is passed in a first reboiler located in the main regeneration column and in a secondary reboiler located in the secondary regeneration column; the steam produced by said secondary reboiler is used first for regenerating the fraction of solution to be delivered to the second stage of the absorber, and then for regenerating the fraction of solution to be delivered to the first stage of the absorber.

16. The process of claim 11, wherein the fractions of solution extracted from the main column are directly delivered to the secondary column, each fraction being divided in at least two sub-fractions which are introduced at different heights of said secondary column.

17. The process of claim 11 comprising the additional steps of:
 e. delivering the steam issuing from the top of said secondary column, to an additional secondary column;
 f. extracting a fraction of solution from the upper portion of said first stage of the main regeneration column and delivering said fraction to the additional secondary column, to thereby regenerate the fraction with said steam issuing from the secondary column;
 g. regulating the amount of said fraction of (f) in such a way as to regenerate the fraction to the same regeneration degree as the solution issuing from the bottom of the first stage of the main regeneration column;
 h. combining said fraction of (f) and the solution issuing from the first stage of the main regeneration column and regenerating said combined fraction and solution in the first stage of the secondary regeneration column, extracting them from the latter and delivering them to the first stage of the absorption column.

18. The process of claim 13, wherein the pressure of the main regeneration column is controlled in such a way as to establish, between the top and the bottom of said column, a temperature difference to 10°–45° C, depending upon the unitary amount of heat supplied to said column from the outside.

19. The process of claim 17, wherein the pressure of the main regeneration column is controlled in such a way that the steam issuing from the top thereof is in excess not greater than 1.5–3 times with respect to the amount corresponding to the equilibrium conditions prevailing at the top of said column.

20. The process of claim 17, wherein the steam issuing from the top of the secondary regeneration column is brought into direct contact with the water feeding a boiler, thus condensing and heating said water.

21. The process of claim 17, wherein the purification cycle is a two stage cycle; the heat necessary for the functioning of said cycle is the one contained in the gaseous mixture to be purified; said gaseous mixture to be purified is passed in a first reboiler located in the main regeneration column and in a secondary reboiler located in the secondary regeneration column; the steam produced by said secondary reboiler is used first for regenerating the fraction of solution to be delivered to the second stage of the absorber, and then for regenerating the fraction of solution to be delivered to the first stage of the absorber.

22. The process of claim 17, wherein the fractions of solution extracted from the main column are directly delivered to the secondary column, each fraction being divided in at least two sub-fractions which are introduced at different heights of said secondary column.

23. The process of claim 17, wherein said fraction regenerated in said additional secondary column is extracted, taken up by pumping and delivered to the main regeneration column.

24. In a process for eliminating and recovering gaseous impurities such as $CO_2$, $H_2S$, HCN, $SO_2$ from a gaseous mixture containing them by an absorption technique carried out at a temperature of from 40° to 135° C, wherein said gaseous mixture is brought into contact with an alkaline absorbing solution selected from the group consisting of solutions of alkali metal carbonate, alkali metal carbonate solutions activated by glycine, an amino acid, ethanolamine or $As_2O_3$; amino acid solutions; ethanolamine solutions, solutions of alkali metal phosphates, sulfites, bisulfites and borates; and a regeneration step wherein the exhausted absorbing solution is regenerated by steam stripping and expulsion of the impurities previously absorbed, said regeneration step actually consisting of two columns, respectively a main column and a secondary column, the main column operating at a higher pressure than the secondary column, the improvement which comprises:
 a. conveying substantially all the exhausted absorption solution to the secondary regeneration column and heating and partially regenerating the solution;
 b. conveying said solution (a) by pumping to the main regeneration column where regeneration of solution (a) is completed by means of outside heat;
 c. conveying the solution (b), after regeneration, to an expansion chamber where the solution is expanded to the pressure of the secondary column, to thereby flash off steam;
 d. delivering the steam produced by said expansion to the secondary column and bringing it into contact with the solution of (a);
 e. conveying to the absorption step the solution regenerated in (b) and expanded in (c).

25. The process of claim 24, wherein the pressure of the main regeneration column is controlled in such a way as to establish, between the top and the bottom of said column, a temperature difference of 10°–45° C, depending upon the unitary amount of heat supplied to said column from the outside.

26. The process of claim 24, wherein the pressure of the main regeneration column is controlled in such a way that the steam issuing from the top thereof is in excess not greater than 1.5–3 times with respect to the amount corresponding to the equilibrium conditions prevailing at the top of said column.

27. In a process for eliminating and recovering gaseous impurities such as $CO_2$, $H_2S$, HCN, $SO_2$ from a gaseous mixture containing them by an absorption technique carried out at a temperature of from 40° to 135° C, wherein said gaseous mixture is brought into contact with an alkaline abosrbing solution selected from the group consisting of solutions of alkali metal carbonate, alkali metal carbonate solutions activated by glycine, an amino acid, ethanolamine or $As_2O_3$; amino acid solutions; ethanolamine solutions, solutions of alkali metal phosphates, sulfites, bisulfites and borates; and a regeneration step wherein the exhausted absorbing solution is regenerated by steam stripping and expulsion of the impurities previously absorbed, said regeneration step actually consisting of two columns, respectively a main column and a secondary column, the main column operating at a higher pressure than the secondary column, the improvement which comprises:
 a. using in the regeneration step an additional secondary column, in addition to said main and secondary columns;
 b. delivering substantially all the exhausted solution, to the secondary regeneration column, wherein it is regenerated in an incomplete manner extracting the partially regenerated solution from said column and dividing it in two fractions;
 c. delivering the first of said fractions of (b), by pumping, to the main column wherein its regeneration is completed by means of externally supplied heat;
 d. delivering the second of said fractions of (b) to the additional secondary column and treating the latter therein with the steam of (f);
 e. extracting the fraction of solution of (c) after regeneration, and delivering it to an expansion chamber wherein it is expanded to the pressure of the secondary column thereby evolving steam;
 f. delivering said evolved steam of (e) to the additional secondary column, wherein it is contacted with said fraction of solution (d) and delivering then said steam to the secondary column, wherein it is contacted with said solution (b) coming from the absorption step;
 g. delivering said fraction of solution (c), extracted from the main column and from the expansion chamber of (e), to the absorption step together with the fraction of solution (d) extracted, after regeneration, from the additional regeneration column.

28. The process of claim 27, wherein the pressure of the main regeneration column is controlled in such a way as to establish, between the top and the bottom of said column, a temperature difference of 10°–45° C, depending upon the unitary amount of heat supplied to said column from the outside.

29. The process of claim 27, wherein the pressure of the main regeneration column is controlled in such a way that the steam issuing from the top thereof is in excess not greater than 1.5-3 times with respect to the amount corresponding to the equilibrium conditions prevailing at the top of said column.

30. In a process for eliminating and recovering gaseous impurities such as $CO_2$, $H_2S$, HCN, $SO_2$ from a gaseous mixture containing them by an absorption technique carried out at a temperature of from 40° to 135° C, wherein said gaseous mixture is brought into contact with an alkaline absorbing solution selected from the group consisting of solutions of alkali metal carbonate, alkali metal carbonate solutions activated by glycine, an amino acid ethanolamine or $As_2O_3$; amino acid solutions; ethanolamine solutions, solutions of alkali metal phosphates, sulfites, bisulfites and borates; and a regeneration step wherein the exhausted absorbing solution is regenerated by steam stripping and expulsion of the impurities previously absorbed, said regeneration step actually consisting of two columns, respectively a main column and a secondary column, the main column operating at a higher pressure than the secondary column, the improvement which comprises:
 a. delivering substantially all the exhausted absorbing solution to the main regeneration column operating with outside heat and regenerating the solution in an incomplete manner;
 b. extracting at least two fractions having different carbonation degrees at different heights of said main column;
 c. delivering said fractions of solution at different heights of the secondary column and expanding them in the latter with production of steam to regenerate said fractions;
 d. extracting the fractions of solution (c) thus completely regenerated in the secondary column from the latter and conveying them to the absorption column.

31. The process of claim 27, wherein the pressure of the main regeneration column is controlled in such a way as to establish, between the top and the bottom of said column, a temperature difference of 10°–45° C, depending upon the unitary amount of heat supplied to said column from the outside.

32. The process of claim 30, wherein the pressure of the main regeneration column is controlled in such a way that the steam issuing from the top thereof is in excess not greater than 1.5-3 times wiith respect to the amount corresponding to the equilibrium conditions prevailing at the top of said column.

33. The process of claim 30, wherein the steam issuing from the top of the secondary regeneration column is brought into direct contact with the water feeding a boiler, thus condensing and heating said water.

34. The process of claim 30, wherein the purification cycle is a two-stage cycle; the heat necessary for said cycle being contained in the gaseous mixture to be purified; said gaseous mixture to be purified being passed in a first reboiler located in the main regeneration column and in a secondary reboiler located in the secondary regeneration column; the steam produced by said secondary reboiler being used first for regenerating the fraction of solution to be delivered to the second stage of the absorber, and then for regenerating the fraction of solution to be delivered to the first stage of the absorber.

35. The process of claim 30, wherein the fractions of solution extracted from the main column are directly delivered to the secondary column, each fraction being divided in at least two sub-fractions which are introduced at different heights of said secondary column.

36. The process of claim 30, wherein the solution treated in the additional secondary column is extracted from the latter, taken up by pumping and delivered to the main regeneration column.

37. In a process for eliminating and recovering gaseous impurities such as $CO_2$, $H_2S$, HCN, $SO_2$ from a gaseous mixture containing them by an absorption technique carried out at a temperature of from 40° to 135° C, wherein said gaseous mixture is brought into contact with an alkaline absorbing solution selected from the group consisting of solutions of alkali metal carbonate, alkali metal carbonate solutions activated by glycine, an amino acid, ethanolamine or $As_2O_3$; amino acid solutions; ethanolamine solutions, solutions of alkali metal phosphates, sulfites, bisulfites and borates; and a regeneration step wherein the exhausted absorbing solution is regenerated by steam stripping and expulsion of the impurities previously absorbed, said regeneration step actually consisting of two columns, respectively a main column and a secondary column, the main column operating at a higher pressure than the secondary column, the improvement which comprises:

a. using a two-stage absorption column; a main regeneration column equipped for the extraction of at least three fractions of solution at different heights; a secondary regeneration column comprising two stages, respectively a lower stage and an upper stage;

b. delivering the exhausted absorbing solution substantially in its totality to the main column;

c. extracting at least three fractions of solution with different carbonation degrees at different heights of said main column;

d. extracting a fraction of solution from the bottom of the main column and delivering it to the lower stage of the secondary column where it expands, produces steam, and completes its regeneration, extracting said regenerated fraction from said lower stage and conveying it to the top of the second stage of the absorption column; delivering the steam produced by the aforesaid expansion and issuing from said lower stage of the abosorption column to the upper stage of the secondary column;

e. delivering the other fractions of solution extracted at intermediate heights of the main column to different heights of the upper stage of the secondary regeneration column wherein they are expanded with production of steam, said steam regenerating the fractions of solution introduced at higher level, together with the steam coming from the lower stage of the secondary column;

f. extracting the fractions of solution of (e), improved in regeneration in said upper stage of the secondary column, from said column and conveying them to the first stage of the absorption column.

38. The process of claim 37, wherein the pressure of the main regeneration column is controlled in such a way as to establish, between the top and the bottom of said column, a temperature difference of 10°–45° C, depending upon the unitary amount of heat supplied to said column from the outside.

39. The process of claim 37, wherein the pressure of the main regeneration column is controlled in such a way that the steam issuing from the top thereof is in excess not greater than 1.5–3 times with respect to the amount corresponding to the equilibrium conditions prevailing at the top of said column.

40. The process of claim 37, wherein the steam issuing from the top of the secondary regeneration column is brought into direct contact with the water feeding a boiler, thus condensing and heating said water.

41. The process of claim 37, wherein the purification cycle is a two-stage cycle; the heat necessary for of said cycle being contained in the gaseous mixture to be purified; said gaseous mixture to be purified being passed in a first reboiler located in the main regeneration column and in a secondary reboiler located in the secondary regeneration column; the steam produced by said secondary reboiler being used first for regenerating the fraction of solution to be delivered to the second stage of the absorber, and then for regenerating the fraction of solution to be delivered to the first stage of the absorber.

42. The process of claim 37, wherein the fractions of solution extracted from the main column are directly delivered to the secondary column, each fraction being divided in at least two sub-fractions which are introduced at different heights of said secondary column.

43. The process of claim 37, wherein the solution treated in the additional secondary column is extracted from the latter, taken up by pumping and delivered to the main regeneration column.

* * * * *